Figure 1:
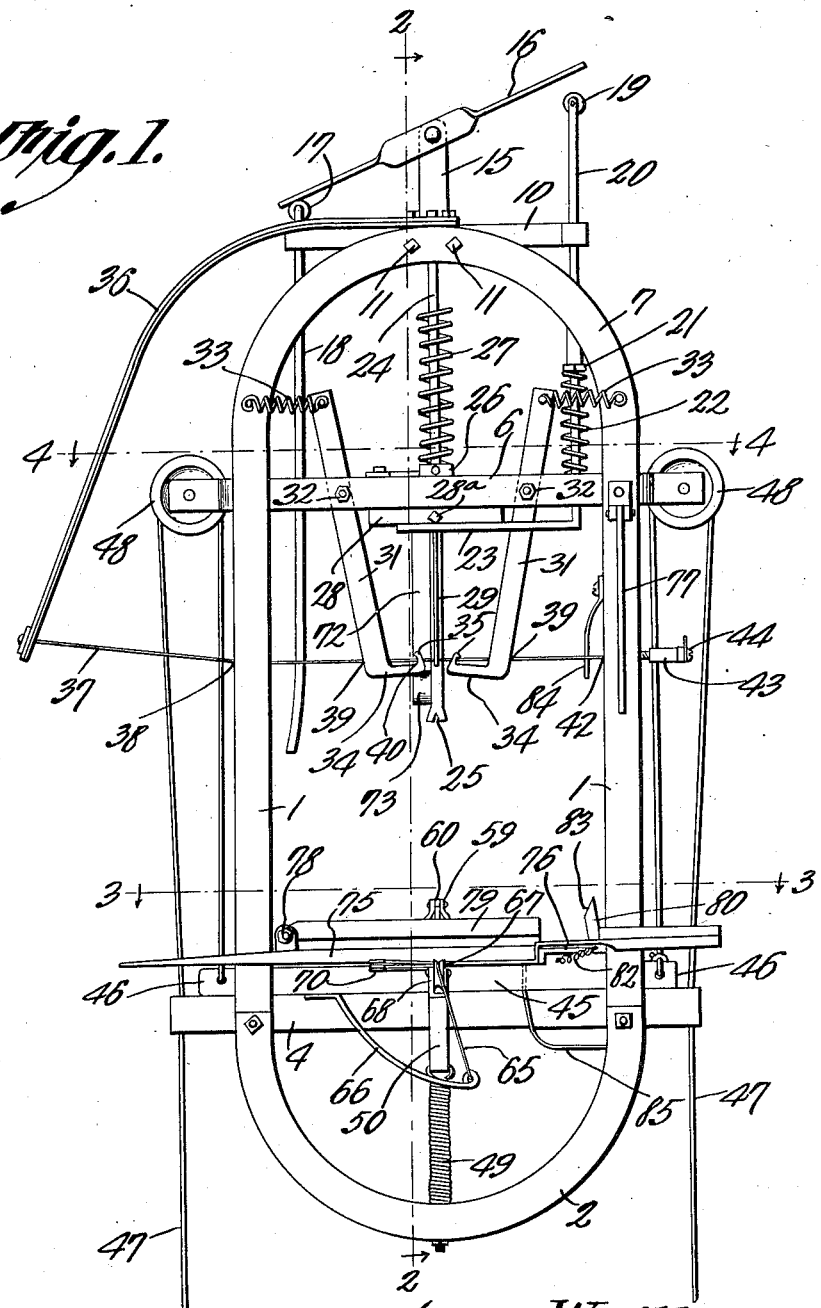

G. W. ALLEN.
PEACH STONING MACHINE.
APPLICATION FILED JULY 8, 1913.

1,091,723.

Patented Mar. 31, 1914.
3 SHEETS—SHEET 1.

Witnesses

George W. Allen, Inventor
by C. A. Snow & Co., Attorneys

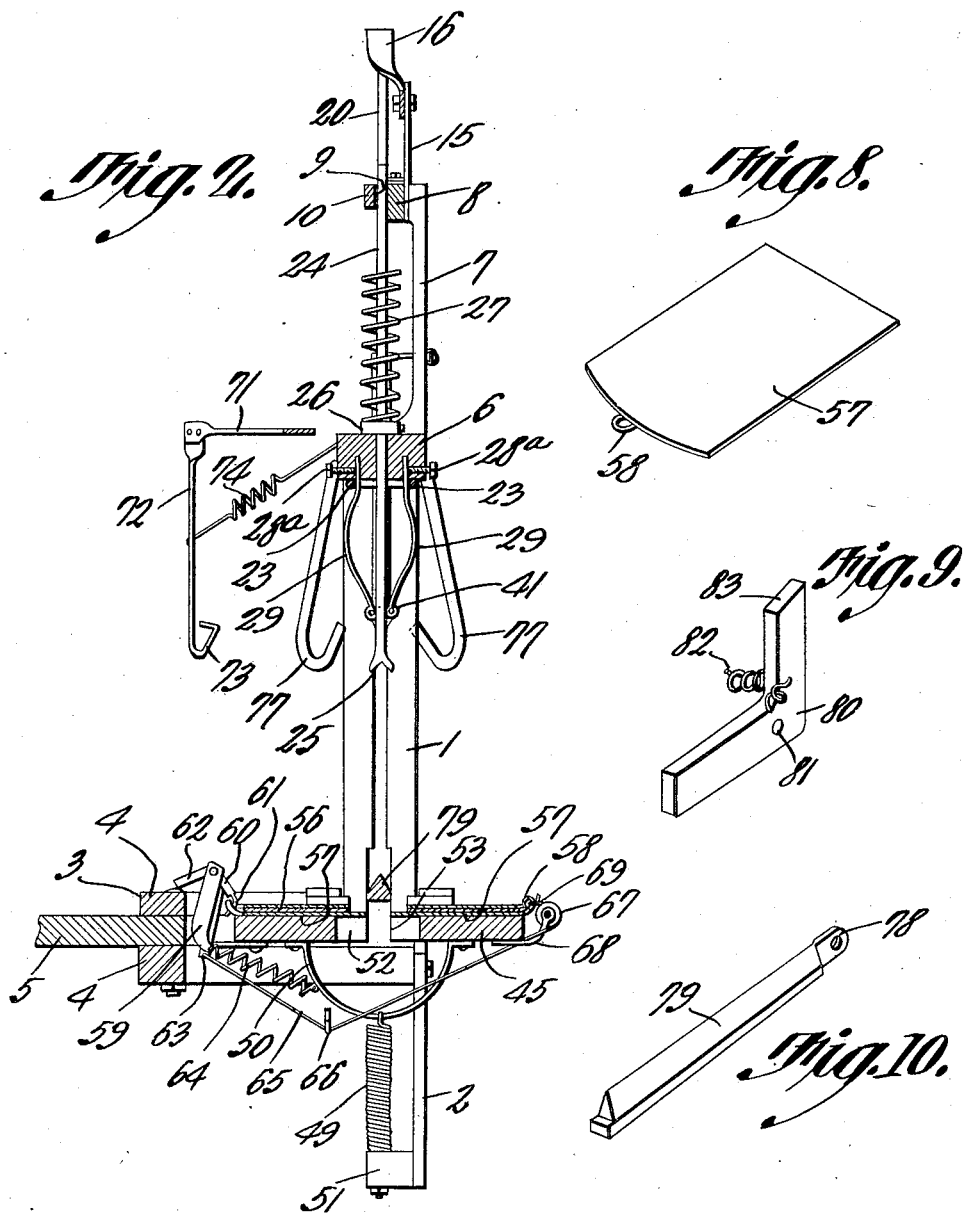

G. W. ALLEN.
PEACH STONING MACHINE.
APPLICATION FILED JULY 8, 1913.
1,091,723.
Patented Mar. 31, 1914.
3 SHEETS—SHEET 3.
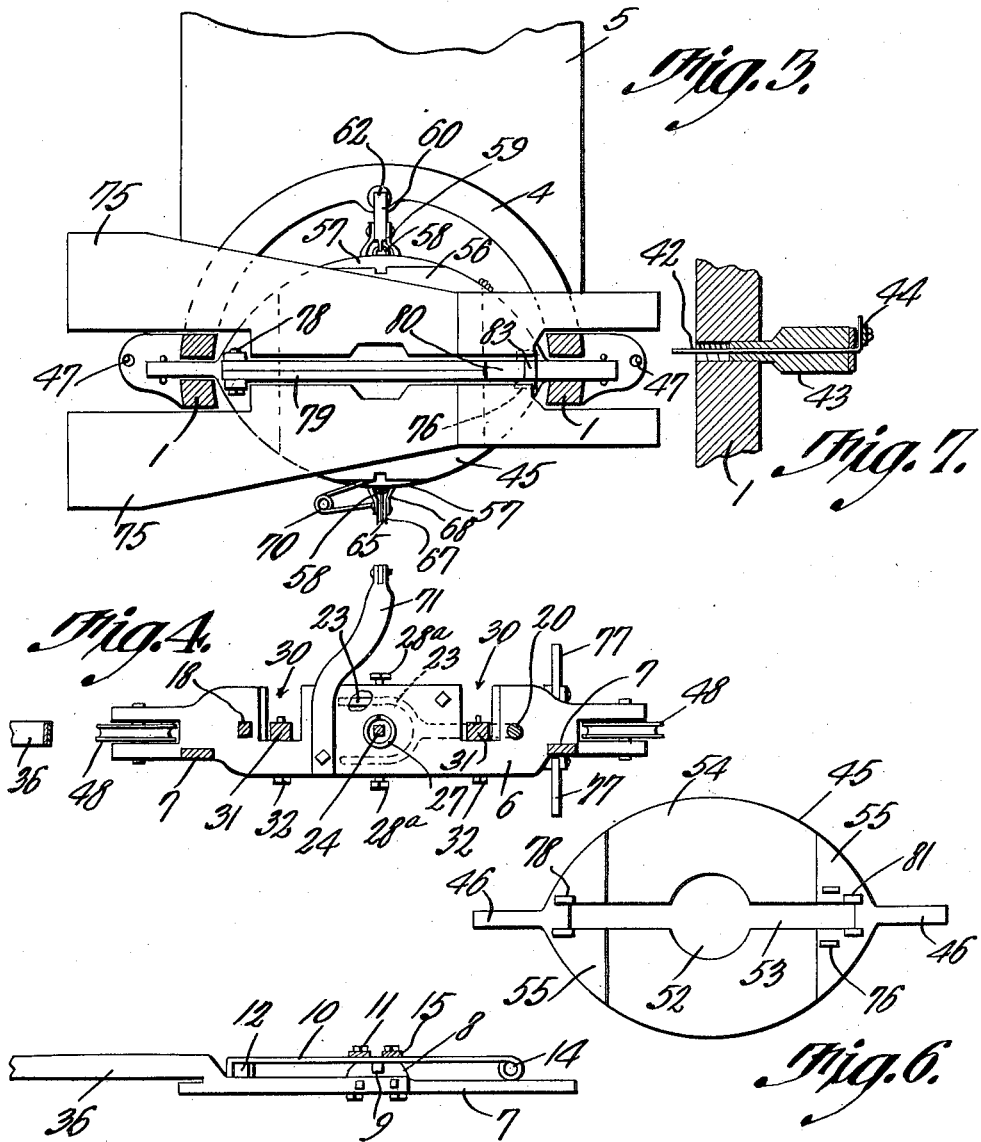
Witnesses
George W. Allen
Inventor
by C. A. Snow & Co.
Attorneys

UNITED STATES PATENT OFFICE.

GEORGE WILLIAM ALLEN, OF SELMA, CALIFORNIA.

PEACH-STONING MACHINE.

1,091,723.   Specification of Letters Patent.   Patented Mar. 31, 1914.

Application filed July 8, 1913. Serial No. 777,927.

*To all whom it may concern:*

Be it known that I, GEORGE W. ALLEN, a citizen of the United States, residing at Selma, in the county of Fresno and State of California, have invented a new and useful Peach-Stoning Machine, of which the following is a specification.

The device forming the subject matter of this application is adapted to be employed for separating the pits of cling-stone peaches from the meats thereof.

One object of the present invention is to provide novel mechanism for separating the pit from the meat of the peach.

Another object of the invention is to provide novel mechanism for disposing of the pits.

Another object of the invention is to provide novel means for receiving and deflecting the meats after the pits have been removed therefrom.

It is within the scope of the invention to provide novel mechanism whereby the several movably coacting parts of the structure may be operatively connected and actuated.

The invention aims to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings: Figure 1 is a side elevation of the complete machine; Fig. 2 is a longitudinal vertical section of the complete machine; Fig. 3 is a transverse section on the line 3—3 of Fig. 1; Fig. 4 is a transverse section on the line 4—4 of Fig. 1; Fig. 5 is a top plan of a portion of the supporting frame; Fig. 6 is a plan of the movable platform; Fig. 7 is a fragmental vertical section taken through one of the standards of the supporting frame; Fig. 8 is a perspective of one of the movable slides; Fig. 9 is a perspective of the knife supporting lever; and Fig. 10 is a perspective of the knife which coöperates with the lever or latch shown in Fig. 9.

In carrying out the invention there is provided a supporting frame, including standards 1, united at their lower ends by an arched, downwardly extended brace 2, seen most clearly in Fig. 1. The lower ends of the standards 1 are secured to a base which is denoted generally by the numeral 3, the base 3 in the present instance being shown as comprising a pair of half rings 4, between which the edge of a work table 5 is adapted to be engaged. The standards 1 are connected adjacent their upper ends by a transverse cap 6. Secured to the cap 6 and upstanding therefrom is an arched brace 7, provided upon one side with an outstanding lug 8 as shown best in Fig. 5. In the side face of the lug 8 there is a polygonal opening 9, closed by a transverse bar 10 constituting a guide, there being securing elements 11 passing through the bar 10 and through the crown of the brace 7. At one end of the guide bar 10 there is a polygonal opening 12 and at the other end of the guide bar there is a circular opening 14. Fixed to the brace 7 and ordinarily held in place by the securing elements 11 is an upstanding support 15.

Fulcrumed intermediate its ends on the support 15 is a walking beam 16, adapted at one end to be engaged by a roller 17 carried at the upper end of a vertically movable rod 18 of polygonal cross section, the rod 18 being slidably received in the opening 12 of the bar or guide 10 shown in Fig. 5, the rod 18 being mounted to reciprocate in another polygonal opening formed in the cap 6, as shown in Fig. 4. The lower end of the bar 18 extends some distance below the cap 6 as shown in Fig. 1. The other end of the walking beam 16 is adapted to be engaged by a roller 19 carried at the upper end of a vertically movable rod 20 passing through the opening 14 in the guide bar 10 as shown in Fig. 5, the rod 20 being mounted to slide in the cap 6, as clearly illustrated in Fig. 4. The rod 20 is provided with an adjustable abutment 21 receiving the upper end of a compression spring 22 which surrounds the rod, the lower end of the compression spring 22 bearing against the cap 6 as shown in Fig. 1. The lower end of the rod 20 is equipped with spaced fingers 23 which extend toward the center of the machine and are disposed approximately at right angles to the rod 20.

Mounted to reciprocate vertically in the opening 9 shown in Fig. 5 and to reciprocate in the cap 6 as shown in Fig. 4 is a plunger 24. The fingers 23 lie upon opposite sides of the plunger 24 as shown in Fig. 2. At its lower end, the plunger 24 terminates in a fork 25. The plunger 24 is provided, as shown in Fig. 1 with an adjustable abutment 26, adapted to engage the cap 6 to limit the downward movement of the plunger. A coiled compression spring 27 surrounds the rod or plunger 24 and is engaged at its lower end by the abutment 26. The upper end of the spring 27 is spaced from the lug 8 on the brace 7 but is adapted to engage the lug when the plunger 24 is moved upwardly to a sufficient extent. The lower face of the cap 6 is provided with an extension 28 shown in Figs. 1 and 2 and through the extension 28 are inserted curved, vertically mounted resilient fingers 29, the fingers being alined with the plunger 24. The fingers 29 as will be understood best from Figs. 2 and 1, lie between the fingers 23 which constitute a part of the rod 20, the fingers 29 being adapted to be compressed with the fingers 23, when the rod 20 is moved downwardly by the walking beam 16. The resilient, vertically disposed fingers 29 are held in place by set screws 28ª threaded into the extension 28 of the cap 6.

In one side face of the cap 6, as shown in Fig. 4, there are notches 30 in which are disposed vertically positioned knife bars 31, held in place by pivot elements 32 which pass through the bars and engage the cap 6 within the contour of the notches 30. Retractile springs 33 are secured to the upper ends of the knife bars 31, the outer ends of the springs 33 being secured to the brace 7 as shown in Fig. 1. The function of the springs 33 is to throw the lower ends of the knife bars toward the plunger 24. At their lower ends, the knife bars 31 are provided with horizontally disposed blades 34 which project toward the vertical center of the machine. The blades 34 at their inner ends are equipped with upstanding lugs 35 appearing most clearly in Fig. 1. A pair of superposed leaf springs 36 are secured at their inner, upper ends to the crown of the brace 7 as shown in Fig. 5, the other ends of the springs 36 extending downwardly at one side of the machine as shown in Fig. 1. To the lower ends of the leaf springs 36 are secured the ends of a pair of flexible, resilient elements, preferably taking the form of wires 37. As indicated at 38 in Fig. 1, the wires 37 pass slidably through one of the standards 1 and as indicated at 39 pass slidably through the knife bars 31, the wires as shown at 40, passing through the lugs 35 of the knife bars. As indicated at 41 and as shown to best advantage in Fig. 2, the wires 37 pass slidably through the lower ends of the vertically disposed spring fingers 29. Referring to Figs. 1 and 7, the wires 37 pass as shown at 42 through the other standard 1 and through tubular screws 43 which are threaded into the said standard. The outer ends of the wires 37 are held engaged with the screws 43 by a retaining device 44 of any desired sort.

The invention further includes a vertically movable platform shown in outline in Fig. 6. At its ends, the platform 45 is provided with extensions 46 which are slidably received in the standards 1, as will be understood best from Figs. 1 and 3. A means is provided for raising the platform 45, this means ordinarily comprising a pair of flexible elements 47, secured at one end to the extensions 46, the flexible elements being trained about pulleys 48 carried by the ends of the cap 6. The extremities of the flexible elements 47 are downwardly prolonged and may be connected with a pedal (not shown) or with any other suitable means for actuating the flexible elements to effect a raising of the platform. The platform is depressed by a retractile spring 49, reference being had to Figs. 1 and 2. The upper end of the spring 49 is secured to a bail 50 attached to the bottom of the platform 45, the lower end of the spring 49 being secured to an offset 51 constituting a part of the curved brace 2. The platform 45 is provided with a central opening 52, alined with the plunger 24, the opening 52 being intersected by a slot 53, the slot 53 and the standards 1 being in a common vertical plane. In the upper face of the platform 45 there is a transverse channel 54, defining raised ends 55 upon the platform. A guide plate 56 shown in Figs. 3 and 2 is supported by the ends 55 of the platform.

Mounted to reciprocate in the channel 54 toward and away from the vertical center of the machine is a pair of slides 57, one of which is shown in Fig. 8, each slide 57 being provided at its outer end with an eye 58. Secured to one edge of the platform 45 (see Fig. 2) is a bracket 59 upon which is fulcrumed a lever 60, equipped with an eye or loop 61 which is loosely received in the eye 58 of one slide 57. The lever 60 includes a laterally extended arm 62 and a downwardly extended arm 63. A retractile spring 64 is attached to the lower end of the arm 63 and is secured to the bail 50. The function of the spring 64 is to actuate the lever 60 and one slide 57, so that the inner edge of the slide stands part way across the opening 52 in the platform. A spring means is provided, as hereinafter described, for moving the inner edge of the other slide 57 inwardly, so that the slides will coöperate to close the opening 52. To the lower end of the arm 63 of the lever 60 is secured one end of a flexible element 65, passed through an eye formed in the lower end of an arm 66, as shown in Fig. 1, attached to the bottom of the platform 45. The flexible element 65 is trained over a pulley 67, carried by a bracket 68 attached to one edge of the platform 45, the extremity of the flexible element 55 being connected as shown at 69 with the eye 58 of the other slide 57. This last mentioned slide 57 is moved inwardly by means of an arched spring 70 shown in Fig. 3, one end of the spring 70 being secured to the above mentioned slide 57, and the other end of the spring 70 being connected to some accessible portion of the machine, such as the bracket 68. An arm 71 is attached at its inner end as shown in Fig. 4 to the cap 6. A resilient finger 72 is secured to the end of the arm 71 as shown in Fig. 2. The finger 72 terminates at its lower end in a latch head 73 which is adapted to coöperate with the arm 62 of the lever 60. A retractile spring 74 connects the finger 72 with the cap 6 or with some other appropriate portion of the frame of the machine.

The invention further includes a pair of dumping planes 75 pivoted as indicated at 76 to the platform 45. Pivotally supported by one of the standards 1 is a pair of hooks 77 which are adapted to coöperate with the dumping planes 75 to tilt the same upon their pivotal mounting 76.

Pivoted as indicated at 78 to the platform 45 is a supporting knife 79 adapted to move downwardly through the slot 53 in the platform 45 and through a similarly formed slot in the guide plate 56, Fig. 6 serving to illustrate the construction whereby a downward movement of the knife is possible. The free end of the knife 79 is adapted to be upheld by one end of an angular latch 80 as shown in Fig. 9 in detail, the latch being pivoted as indicated at 81 upon the platform 45. Springs 82, as shown in Fig. 1, connect the latch 80 with the platform 45 and serve to position the latch in such a manner that the same will uphold the free end of the knife 79. The upper end of the latch 80 is beveled as indicated at 83 to engage with a cam strip 84, shown in Fig. 1 as secured to one of the standards 1. The function of the cam strip 84 is to tilt the latch 80 when the platform 45 moves upwardly to a sufficient extent, thereby permitting the free end of the knife 79 to drop. When the platform 45 moves downwardly, the knife 79 at its free end is disposed in supporting relation upon the latch 80 through the medium of a stop arm 85 projecting from the brace 2 of the frame of the machine.

The operation of the structure is as follows: Presupposing that the platform 45 is in lowered position as shown in Figs. 1 and 2, the peach is placed upon the edge of the knife 79, the knife being held in horizontal position by engagement with the latch 80. The flexible elements 47 are then drawn upon, and the platform 45 is raised. When the platform 45 moves upwardly, the peach is engaged by the fork 25 which is formed at the lower end of the plunger 24, the fork straddling the upper end of the pit of the peach. By this operation, the plunger 24 is forced upwardly and the spring 27 is put under compression. The peach, by the upward movement of the platform 45 is brought into engagement with the blades 34 of the knife bars 31. The blades 34 cut circumferentially through the meat of the peach in a vertical direction, the springs 33 yielding to permit necessary movement of the knife bars 31, the blades of the knife bars 31, approaching each other beneath the pit of the peach. The wires 37, constrained by the springs 36, sweep around the pit of the peach and serve to sever the pit from the meat. The wires 37 are forced to follow the contour of the pit of the peach, by the action of the spring fingers 29 through which the wires 37 pass. By the time that the platform 45 has reached the limit of its upward movement, the peach has been severed and the pit thereof is resting in the grip of the wires 37. When the platform 45 has moved upwardly to a sufficient extent, the same will strike the lower end of the rod 18 and effect a tilting of the walking beam 16, the same depressing the rod 20, the fingers 23 of which pass along the curved fingers 29 and thus hold the wires 37 to the pit of the peach. As the platform 45 moves upwardly, the beveled end 83 of the latch 80 will engage the cam strip 84 and effect a tilting of the latch 80, thereby withdrawing the latch from engagement with the knife 79. Thereupon, the knife at its free end will drop. When the platform 45 moves upwardly, the arm 62 of the lever 60 will be engaged by the latch head 73 of the spring finger 72, and the dumping planes 75 will be engaged by the pivotally mounted hooks 77. When the platform starts to move downwardly, the spring 22 will restore the rod 20, the walking beam 16 and the rod 18 to the positions shown in Fig. 1. The fingers 23 which constitute a part of the rod 20 will therefore move upwardly, relieving the pressure upon the spring fingers 29. At the same time, the pressure of the pit against the plunger 24 will be relieved, and the spring 27 will thrust the plunger downwardly, ejecting the pit through the opening 52 in the platform 45, the slides 57 being retracted to permit the passage of the pit, in the manner now to be set forth. Recalling that upon the upward movement of the platform 45, the arm 62 of the lever 60 is engaged with the latch head 73 of the spring finger 72, it will be observed that when the platform 45 moves downwardly, the lever 60 will be tilted by the latch head 73 and then the arm 62 will snap off the latch head as the platform moves downwardly. When the lever 60 is tilted, the same will actuate one slide 57 directly to retract the same, the other slide 57 being actuated by the arm 63 of the lever and by the flexible element 65 which passes over the pulley 67. The springs 64 and 70 serve to move the slides toward each other, so soon as the arm 62 of the lever is disengaged from the latch head 73. At this point it may be stated that when the slides 57 are advanced toward each other, as hereinbefore stated, these slides serve as a support for the peach, to prevent the same from being bursted during the pit removing operation.

When the meat of the peach is stripped from the pit by the operation above described, the halves of the peach will drop upon the dump planes 75. Recalling that the dump planes, by the upward movement of the platform 45 have engaged with the pivotally mounted hooks 77, it will be obvious that when the platform moves downwardly, the dump planes will be elevated so as to discharge the halves of the peach. When the platform 45 has descended to a sufficient degree under the action of the spring 49, the extremities of the dump planes slide off the hooks 77, whereupon the planes resume the positions shown in Fig. 1. When the platform 45 moves downwardly, the stop arm 85 will engage the knife 79 adjacent its free end, and elevate the free end of the knife, so that the same snaps above and engages the latch 80.

By the operation above described, the parts will be restored to the positions shown in Fig. 1.

Obviously, suitable receptacles may be provided for receiving the pits and for receiving the halves of the peach-meat when the latter are projected off the dump planes 75.

Having thus described the invention, what is claimed is:—

1. In a fruit pitting machine, a frame; pitting mechanism movably mounted in the frame; a fruit supporting platform mounted in the frame to move parallel to the direction of movement of the pitting mechanism; and yieldable means for advancing the pitting mechanism; the platform coacting with the said pitting mechanism to retract the pitting mechanism and to render the said yieldable means efficient to advance the pitting mechanism.

2. In a fruit pitting machine, a frame; pitting mechanism carried by the frame; a platform carried by the frame; a fruit supporting element releasably held in fruit engaging position on the platform for dropping movement independently of the platform; and means for producing relative movement between the platform and the pitting mechanism.

3. In a fruit pitting machine, a frame; pitting mechanism carried by the frame; a platform movable on the frame; means for moving the platform toward and away from the pitting mechanism; a releasable fruit support carried by the platform; latch mechanism carried by the platform and adapted to engage the fruit support, and a relatively fixed member on the frame adapted to engage the latch mechanism.

4. In a fruit pitting machine, a frame; pitting mechanism carried by the frame; a platform mounted on the frame for movement toward and away from the pitting mechanism, the platform being provided with an opening; a fruit supporting gate mounted on the platform and movable toward and away from the opening; and means for operating the gate automatically when the platform is moved.

5. In a fruit pitting machine, a frame; pitting mechanism carried thereby; a platform mounted to move upon the frame toward and away from the pitting mechanism; a fruit support movably mounted upon the platform; latch mechanism for holding the support in fruit receiving position; relatively fixed means coöperating with the latch mechanism when the platform is moved; a pair of gates mounted upon the platform and movable toward and away from the fruit supporting element; means for moving the gates toward the fruit supporting element; means for moving the gates away from the fruit supporting element; a relatively fixed member coöperating with the last specified means, when the platform is moved.

6. In a fruit pitting machine, a frame; pitting mechanism carried thereby; a fruit supporting platform movable toward and away from the pitting mechanism; a dumping member movably mounted upon the platform; and relatively fixed means independent of the pitting mechanism and adapted to engage with said member when the platform is moved.

7. In a fruit pitting machine, a frame; pitting mechanism carried thereby; a fruit supporting platform mounted upon the frame for movement toward and away from the pitting mechanism; a dumping member movably mounted upon the platform; and movable means mounted upon the frame in the path of the dumping member, and independent of the pitting mechanism, for effecting a tilting of the dumping member when the platform is moved in one direction.

8. In a fruit pitting machine, severing mechanism comprising opposed flexible elements; fingers connected therewith; and means for effecting a compression of the fingers.

9. In a fruit pitting machine, severing mechanism comprising a pair of transversely flexible members; fingers connected with the said members and extended at an angle thereto; and finger compressing mechanism adapted to move longitudinally upon the fingers.

10. In a fruit pitting machine, severing mechanism comprising a pair of flexible members; oppositely curved fingers with which the severing members are connected; and a compression element adapted to traverse the curved portions of the fingers.

11. In a fruit pitting machine, severing mechanism comprising opposed knives; flexible members coöperating with the knives; and means for controlling the tension of said members between the knives.

12. In a fruit pitting machine, severing mechanism comprising opposed knives; flexible elements coöperating with the knives; fingers coöperating with the flexible elements between the knives; and compression means adapted to traverse the fingers.

13. In a fruit pitting machine, a frame; opposed flexible severing members extended transversely of the frame; mechanism for regulating the tension of the severing members; a fruit supporting platform mounted to move upon the frame, a portion of said mechanism lying in the path of the platform.

14. In a fruit pitting machine, a frame; a walking beam supported thereby; a plunger slidably mounted in the frame and coöperating with one end of the walking beam; a fruit supporting platform movable upon the frame and adapted to engage the plunger; a second plunger movable in the frame and actuable by the walking beam; a pair of transversely flexible severing members; and means for adjusting the tension of the severing members, said means being operable by the last specified plunger.

15. In a fruit pitting machine, a frame; a fruit supporting platform mounted to move upon the frame; a walking beam fulcrumed on the frame; a plunger coöperating with the walking beam and lying in the path of the platform; a second plunger operable by the walking beam and provided with the spaced parts; fingers carried by the frame and adapted to be traversed by said parts; and flexible severing members connected with the fingers.

16. In a fruit pitting machine, a pit expelling plunger; a pair of knives mounted to swing in a common plane with the plunger; and a pair of transversely flexible severing members mounted to slide directly upon the knives and located upon opposite sides of the plunger.

17. In a fruit pitting machine, a frame; pitting mechanism carried by the frame; a platform carried by the frame; a fruit supporting element detachably held in fruit engaging position on the platform; means for producing relative movement between the platform and the pitting mechanism; a gate operating on the platform below the fruit supporting element; and means for operating the gate.

18. In a fruit pitting machine, a frame; pitting mechanism carried by the frame; a platform carried by the frame; means for producing relative movement between the pitting mechanism and the platform; a movable fruit support carried by the platform; a latch carried by the platform and adapted to engage the support; a relatively fixed member on the frame and adapted to engage the latch, to disengage the latch from the fruit support upon relative movement between the platform and the pitting mechanism; and a relatively fixed member on the frame adapted to engage the fruit support to move the same into coöperating relation with respect to the latch, upon relative movement between the pitting mechanism and the platform.

19. In a fruit pitting machine, a frame; pitting mechanism carried by the frame; a platform carried by the frame; means for producing relative movement between the pitting mechanism and the platform; a pair of opposed gates movable upon the platform, there being an opening in the platform with which the gates coöperate; and means for moving the gates toward and away from the opening.

20. In a fruit pitting machine, a frame; pitting mechanism carried by the frame; a platform carried by the frame; means for producing relative movement between the pitting mechanism and the platform; a gate mounted upon the platform there being an opening in the platform with which the gate coöperates; a movable member supported upon the platform and operatively connected with the gate; and relatively fixed means coöperating with the movable member to actuate the gate, upon relative movement between the pitting mechanism and the platform.

21. In a fruit pitting machine, a frame; pitting mechanism carried by the frame; a platform carried by the frame and provided with an opening; means for producing relative movement between the platform and the pitting mechanism; a gate mounted on the platform and controlling the opening; a movable member mounted upon the platform; a flexible element connected with the movable member and extended beneath the platform, the flexible element being connected with a gate; a relatively fixed element upon the platform, around which the flexible element is looped; and fixed means adapted to engage with the movable member, upon relative movement between the pitting mechanism and the platform.

22. In a fruit pitting machine, a frame; pitting mechanism carried by the frame; a platform carried by the frame and provided with an opening; means for producing relative movement between the pitting mechanism and the platform; a pair of gates mounted upon the platform and adapted to coöperate with the opening; resilient means for moving the gates toward each other to cause the gates to coöperate with the opening; means carried by the platform for moving the gates away from the opening; and a member with which the last specified means is adapted to engage upon relative movement between the pitting mechanism and the platform.

23. In a fruit pitting machine, a frame; pitting mechanism carried by the frame; a platform carried by the frame and provided with a pit receiving opening; means for producing relative movement between the platform and the pitting mechanism; a movable closure for the opening; a dumping member mounted upon the platform and adapted to receive the meat of the fruit; and mechanism for operating the closure and the pitting mechanism, upon relative movement between the pitting mechanism and the platform.

In testimony that I claim the foregoing as my own, I have hereto affixed my signature in the presence of two witnesses.

GEORGE WILLIAM ALLEN.

Witnesses:
J. T. FOEKNER,
CHAS. L. KING.

---

Copies of this patent may be obtained for five cents each, by addressing the "Commissioner of Patents, Washington, D. C."